Figure 3:
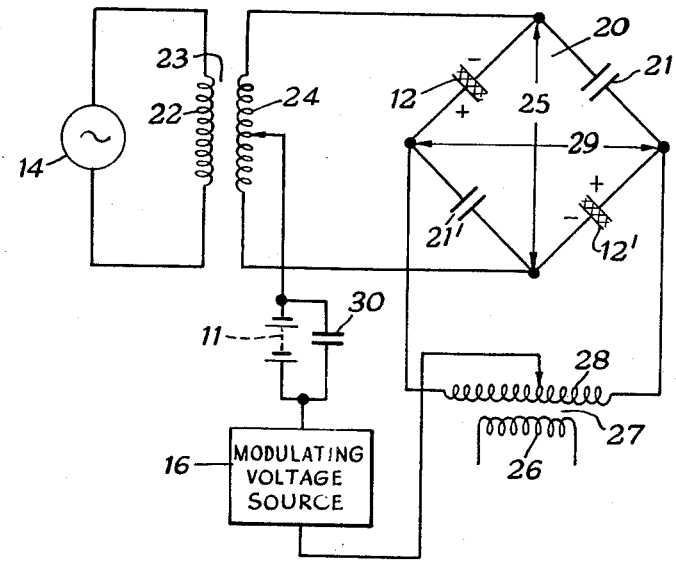

Jan. 26, 1960     D. G. HOLLOWAY ET AL     2,922,959
ELECTRIC MODULATORS
Filed April 20, 1954     4 Sheets-Sheet 1
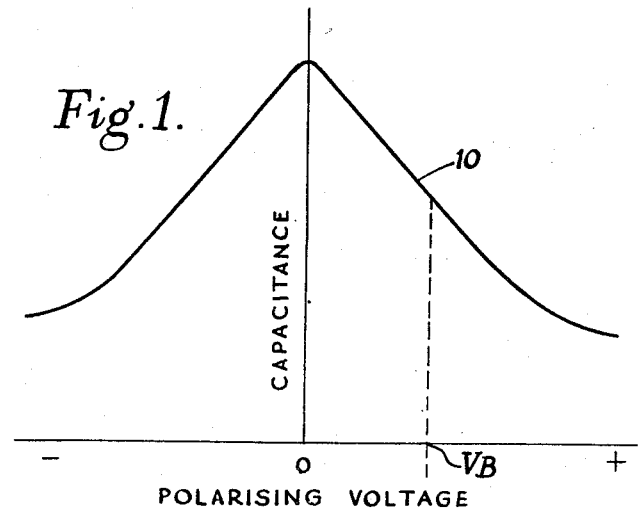
Fig.1.
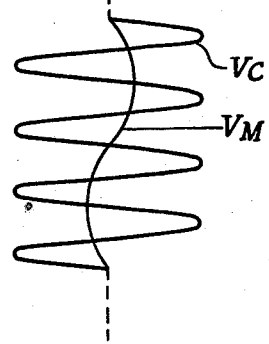
Fig.2.
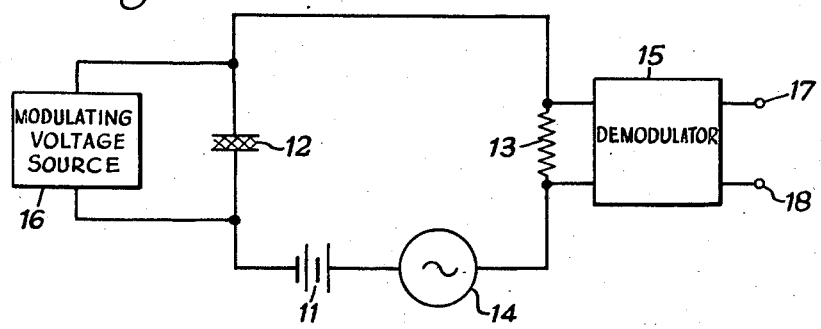
INVENTORS
Dennis G. Holloway
Gerald E. Jacoby
BY
Ralph A. Stuart
ATTORNEY

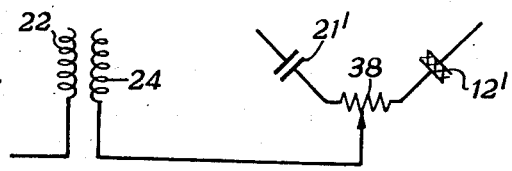
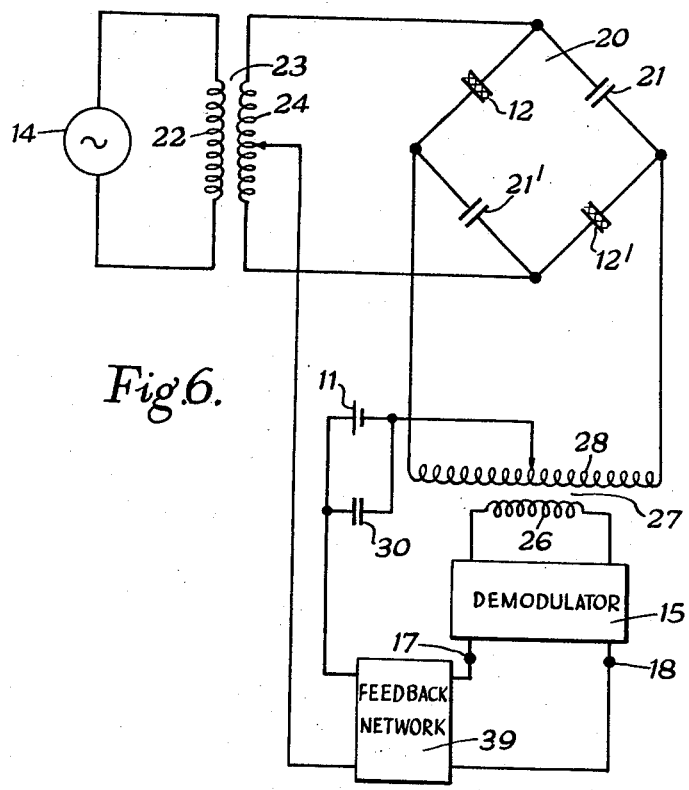
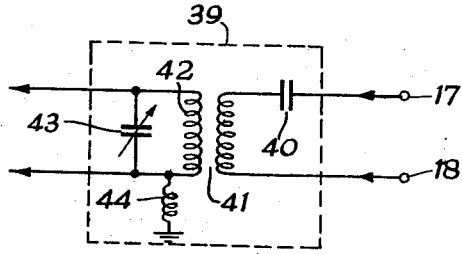

United States Patent Office 2,922,959
Patented Jan. 26, 1960

2,922,959

ELECTRIC MODULATORS

Dennis Godson Holloway, Taplow, Buckinghamshire, England, and Gerald Edward Jacoby, New York, N.Y., assignors to British Telecommunications Research Limited, Taplow, England Application April 20, 1954, Serial No. 424,470

Claims priority, application Great Britain April 29, 1953

4 Claims. (Cl. 332—47)

The present invention relates to electric modulators of the type comprising a non-linear capacitor through which, in operation, a carrier to be modulated is passed and is modulated by the application of a modulating voltage across the capacitor. A non-linear capacitor is a capacitor having a dielectric comprising material whose permitivity varies in dependence upon the voltage across the capacitor. Examples of such material are Rochelle salt and titania and its derivatives such as barium titanate both pure and with the barium partly replaced by other metals such as strontium and lead.

The variation in capacitance of a non-linear capacitor, with change in the voltage across the capacitor, is illustrated by a curve 10 in Figure 1 of the accompanying drawings in which the ordinate represents capacitance and the abscissa represents the voltage across the capacitor. It will be seen that the capacitance has a maximum value when the voltage across the capacitor is zero and decreases with increase in the voltage irrespective of the polarity of the voltage.

In making use of such capacitors, an amplifier has been proposed comprising a modulator followed by a demodulator as shown in Figure 2 of the accompanying drawings. In Figure 2 a bias source 11, a non-linear capacitor 12 and a resistor 13 are connected in series across a source 14 of carrier oscillations. A demodulator 15 is connected across the resistor 13 and a source 16 of modulating voltage is connected direct across the capacitor 12. Output terminals 17 and 18 are provided on the demodulator.

The magnitude of the bias provided by the source 11 may be $V_B$ as shown in Figure 1, and the amplitude of the carrier oscillation provided by the carrier source 14 is preferably just less than the magnitude of the bias as is illustrated by a curve $V_C$ in Figure 1.

In the absence of a modulating voltage from the source 16 a voltage of the carrier frequency is developed across the resistor 13 and has an amplitude depending upon the magnitude of the bias provided by the bias source 11. When a modulating voltage is applied to the capacitor 12 from the source 16 the carrier voltage appearing across the resistor 13 becomes modulated in amplitude because of the variations in the capacitance of the capacitor 12 produced by the modulating voltage. The amplitude of the modulating voltage is preferably small relatively to the amplitude of the carrier voltage across the capacitor 12, as is illustrated by a curve $V_M$ in Figure 1.

The amplitude-modulated carrier oscillation appearing across the resistor 13 is demodulated by the demodulator 15 and the demodulated output appears between the terminals 17 and 18. It can be shown that the energy in the side-bands of the amplitude-modulated carrier is dependent upon the applied carrier voltage whereby the output of the demodulator can theoretically show a gain relatively to the applied modulating voltage.

It is our experience, however, that in practice gains of unity over bandwidths adequate for carrying speech cannot be achieved, or are difficult to achieve, with the non-linear capacitors at present available.

One object of the present invention is to provide an improved modulator of the type specified by means of which an amplifier having a gain substantially in excess of unity over a bandwidth of at least 3 kc./s. can readily be constructed.

According to the present invention a modulator comprises a bridge in which at least one arm includes a non-linear capacitor, a source of carrier oscillations is connected across one diagonal of the bridge, a source of modulating voltage is connected to vary the capacitance of the non-linear capacitor in the bridge, and an inductive output circuit is connected across the other diagonal of the bridge, the bridge being capacitive and providing a resonant circuit with the inductive output circuit. Although the bridge is capacitive it is not essential that all arms be capacitive so long as the bridge as a whole is capacitive.

The resonance frequency of the resonant circuit provided by the bridge and the inductance of the output circuit will in most circumstances be approximately equal to the carrier frequency. There are some circumstances, however, as will be described later, in which the resonance frequency may differ substantially from the carrier frequency.

It is preferred to include non-linear capacitors in at least two arms of the bridge and preferably in all four arms of the bridge, and to apply the modulating voltage to vary the capacitances of all the non-linear capacitors in senses such as to produce the maximum depth of modulation. The source of carrier oscillations is also preferably inductive and provides with the bridge a resonant circuit having a resonance frequency substantially equal to the carrier frequency.

It can be arranged that in the absence of modulating voltage across the non-linear capacitor or capacitors the bridge is balanced and hence that the carrier does not appear in the output circuit. The invention is suitable, therefore, for producing modulated oscillations with suppressed carrier.

Figure 4:
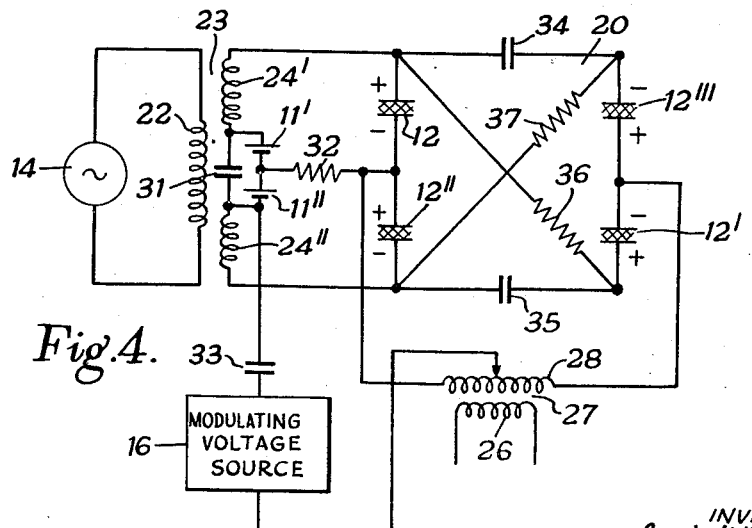
Figure 8:
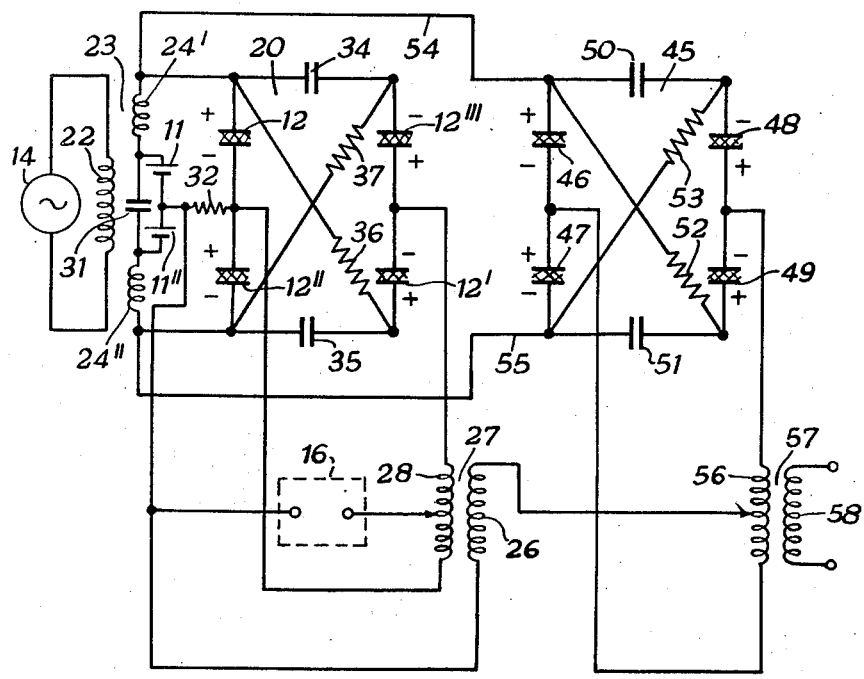

The invention will now be described by way of example with reference to Figures 3 to 8 of the accompanying drawings, in which Figure 3 is a theoretical circuit diagram of one embodiment of the invention wherein two non-linear capacitors are employed, the two non-linear capacitors being connected in two opposite arms of a bridge, Figure 4 is a theoretical circuit diagram of a second embodiment of the invention incorporating four non-linear capacitors connected in the four arms respectively of a bridge, Figure 5 shows a modification of a part of the circuit of Figure 3, Figure 6 is a theoretical circuit diagram of a third embodiment of the invention arranged to function as an oscillator, Figure 7 is a theoretical circuit diagram of a feed-back network suitable for use in the arrangement of Figure 6, and Figure 8 is a theoretical circuit diagram of a further embodiment of the invention in which a modulator is followed by a demodulator and the circuit acts as an amplifier, the demodulator comprising a further bridge circuit incorporating non-linear capacitors.

Throughout the drawings like parts are given the same references, and non-linear capacitors are distinguished from conventional capacitors by the use of cross-hatching between the plates of non-linear capacitors.

In Figure 3 a modulator is provided by a bridge circuit 20 comprising two non-linear capacitors 12 and 12' and two conventional capacitors 21 and 21', the two non-linear capacitors being connected in two opposite arms respectively of the bridge and the two conventional capacitors being connected in the two other arms respectively of the bridge. The source 14 of carrier oscillations is connected across the primary winding 22 of a transformer 23 and the secondary winding 24 of the transformer 23 is connected across one diagonal 25 of the bridge 20. The output appears across the secondary winding 26 of a further transformer 27 whose primary winding 28 is connected across the other diagonal 29 of the bridge 20.

It is arranged that the resonance frequency of the resonant circuit constituted by the inductance of the input circuit measured across the secondary winding of the transformer 24 and the capacitance of the bridge measured across the diagonal 25 equals the frequency of the carrier.

The resonance frequency of the resonant circuit constituted by the inductance of the output circuit measured across 28 and the bridge capacitance measured across 29 may be arranged to equal the carrier frequency or a sideband frequency as will be described later.

When the ratio arms of the bridge provide a ratio of 1:1 the secondary winding 24 of the transformer 23 and the primary winding 28 of the transformer 27 are centre-tapped as shown, and the source 16 of modulating voltage is connected in series with the bias source 11 between the two centre taps. When the ratio arms provide a ratio other than 1:1 the taps on the windings 24 and 28 are adjusted accordingly. A capacitor 30 is shunted across the bias source 11 and acts as a by-pass at the frequency of the modulating voltage provided by the source 16. As the centre points of the windings 24 and 28 are neutral points the bridge is not disturbed by the connection of the sources 16 and 11 between these centre points. The polarity of the bias of the capacitors 12 and 12'' vary in voltages applied to the two non-linear capacitors 12 and 12' is as indicated by the "+" and "—" signs alongside the plates of the non-linear capacitors.

It can readily be arranged that the bridge is balanced in the absence of modulating voltage whereby no carrier appears at the output terminals and hence on the application of modulating voltage from the source 16 only the two side-bands of the modulated carrier appear.

As the current from the source 16 of modulating voltage flows in opposite directions through the two halves of the winding 28 the resulting magnetic fields substantially cancel one another and hence the modulating voltage itself does not appear in the output of the modulator. Thus there is substantially complete isolation of the source of carrier oscillations from the source of modulating voltage. This is of particular importance when the modulator is used as part of an oscillator to be described later. The voltage appearing across the winding 26 may be applied to a demodulator to provide an amplified version of the modulating voltage provided by the source 16. By introducing a degree of unbalance in the bridge 20 the carrier can be made to appear in the output of the modulator. The demodulator may then be of simple conventional form. For example a full-wave two-element or a bridge rectifier may be used. On the other hand the arrangement may be such that the carrier is suppressed and a demodulator of the switched rectifier type may be used by applying the carrier to the demodulator as a switching voltage. It will be shown later that under some circumstances optimum results are produced by the employment of a further bridge circuit including non-linear capacitors. It will also be shown that by removing the source of modulating voltage and feeding back energy from the output as modulating voltage an oscillator can be produced.

Referring now to Figure 4, this is a theoretical circuit diagram of a second embodiment of the invention in which each of the four arms of the bridge 20 includes a non-linear capacitor, the four non-linear capacitors being shown at 12, 12', 12'' and 12'''. In this embodiment the secondary winding of the transformer 23 is split into two halves 24' and 24'' which are joined by a D.C. blocking capacitor 31. The bias source is in two parts 11' and 11'' connected in series across the capacitor 31 as shown. The junction of the two parts 11' and 11'' of the bias source is connected through a resistor 32 to the junction of the two non-linear capacitors 12 and 12''. One terminal of the source 16 of modulating voltage is connected to the centre tap on the winding 28 and the other terminal of the source 16 is connected through a D.C. blocking capacitor 33 to the negative terminal of the bias source 11''. The upper terminal (in the drawing) of the winding 24' is connected to the upper plate of the non-linear capacitor 12 and through a D.C. blocking capacitor 34 to the upper plate of the non-linear capacitor 12'''. The lower terminal of the winding 24'' is connected to the lower plate of the non-linear capacitor 12'' and through a further D.C. blocking capacitor 35 to the lower plate of the non-linear capacitor 12'. The blocking capacitors 34 and 35 are arranged to have negligible reactances at the carrier frequency. The bias circuits for the two non-linear capacitors 12' and 12''' are completed through two resistors 36 and 37 respectively. These are of high resistance and act as leaks for the D.C. blocking capacitors 34 and 35.

Thus the polarities of the bias voltages applied to the four non-linear capacitors is as indicated by the "+" and "—" signs alongside the plates of the non-linear capacitors, and it will be seen that the polarities of the bias voltages on the capacitors 12 and 12'' are reversed relatively to those on the capacitors 12' and 12'''. In operation, therefore, when a modulating voltage is applied from the source 16, the capacitances of the capacitors 12 and 12'' vary in opposite senses; the capacitances of the capacitors 12''' and 12' vary in opposite senses; the capacitances of the capacitors 12 and 12''' vary in opposite senses; and the capacitances of the capacitors 12'' and 12' vary in opposite senses. On demodulation of the output, therefore, the amplitude of the output may be twice that of the output obtained with an arrangement as shown in Figure 3.

As in the embodiment of Figure 3 the resonant circuit provided by the input inductance together with the capacitance of the bridge is arranged to have a resonance frequency equal to the carrier frequency. Similarly the resonant circuit provided by the capacitance of the bridge and the output inductance may have a resonance frequency equal to the carrier frequency or a sideband frequency.

It will be appreciated that in order to obtain a true balance of the bridge 20 it is necessary to balance not only the reactive components but also the resistive components present in the bridge. The resistance of a non-linear capacitor is substantially lower than that of conventional dielectrics. The resistive components may be balanced in any convenient manner. One simple arrangement for effecting balance of the resistive components is shown in Figure 5, in which the parts 22, 24, 21' and 12' are those of the same references shown in the Figure 3. The lower terminal of the winding 24 instead of being connected direct to the junction of the capacitor 21' with the non-linear capacitor 12' is connected to the wiper of a potentiometer 38 whose fixed element is connected between the two capacitors 21' and 12'. The resistive components of the bridge are balanced by adjustment of the wiper of the potentiometer 38.

Referring now to Figure 6, this shows the arrangement of Figure 3 modified to form an oscillator. It will be seen that the source 16 of modulating voltage is replaced by a circuit including the demodulator 15 and a feed-back network 39. One form of feed-back network which has given satisfactory results is shown in Figure 7, in which the output terminals 17 and 18 of the demodulator 15 of Figure 6 are connected through a capacitor 40 to the primary winding of a transformer 41 whose secondary winding 42 is resonated by a capacitor 43. A choke 44 is connected between the lower terminal (in the drawing) of the winding 42 and earth, to balance out unwanted carrier oscillation of small amplitude which cannot usually be avoided. The capacitor 40 is a D.C. blocking capacitor and in the arrangement used had a value of 0.5 µf. The values of the remaining components were as follows:

Primary winding of transformer 41_____ 40 mh
Secondary winding of transformer 41_____ 350 mh
Capacitor 43_____ 0–0.1 µf
Choke 44_____ 8.5 mh Referring now to Figure 8, this is a theoretical circuit diagram of a further embodiment of the invention incorporating a demodulator in the form of a bridge 45 of non-linear capacitors 46, 47, 48 and 49. It will be seen that the modulator section including the bridge 20 is identical with that shown in Figure 4. Thus the side-bands of the modulated carrier appear across the secondary winding 26 of the transformer 27. The bridge 45 is identical with the bridge 20, the capacitors 50 and 51 functioning as D.C. blocking capacitors and the resistors 52 and 53 serving to complete the biasing circuits of the capacitors 48 and 49 as well as acting as leaks for the capacitors 50 and 51. The carrier voltage appearing across the windings 24' and 24" of the transformer 23 is applied to the bridge 45 through connections 54 and 55 and the primary winding 56 of a transformer 57 is connected as shown. A modulating voltage for the bridge 45 is applied from the secondary winding of the transformer 26 as shown and the demodulated output appears across the secondary winding 58 of the transformer 57.

It can be shown that a demodulator in the form of a bridge of non-linear capacitors as shown in Figure 8 gives greater gain than that obtained when using rectifiers for demodulation provided the arrangement is such that $n$ is smaller than $(k^2 Q_1 Q_3 / 16) - 1$ where $n = \omega_2 / \omega_1$,
$\omega_2$ is the angular frequency of the carrier,
$\omega_1$ is the angular frequency of the modulating voltage,
$k$ is a constant dependent upon the non-linear dielectric material,
$Q_1$ is the ratio of the resistive impedance to the reactive impedance of the bridge at the frequency $\omega_1$,
$Q_3$ is the ratio of the resistive impedance to the reactive impedance at the frequency $\omega_3$ where $\omega_3$ is the side-band frequency $\omega_2 \pm \omega_1$.

In the embodiment of Figure 8 the resonant circuit provided by the input inductance measured across the whole of the secondary winding of the transformer 23 together with the capacitance of the bridges 20 and 45 is arranged to be resonant at the carrier frequency. Similarly the resonant circuit provided by the inductance measured across the winding 28 and the capacitance of the bridge 20 is arranged to have a resonance frequency equal to the carrier frequency. The resonant circuit provided by the inductance measured across the winding 56 and the capacitance of the bridge 45 is arranged to have a resonance frequency equal to the frequency being amplified or, where speech voltages are being amplified, it may be arranged that a low-pass filter is formed by the output impedances and the bridge 45. If, in the embodiments hereinbefore described, the modulator is being employed in an amplifier circuit to amplify one frequency or a narrow band of frequencies as in an oscillator and the frequencies of the two side-bands are widely separated, it is preferred to tune the output circuit to only one of the side-bands whereby the loss in power arising from the use of only one of the side-bands can be compensated by the use of an output circuit of high Q.

As the carrier input circuit is resonated at the carrier frequency, the input impedance when the bridge is balanced has a high value dependent upon the resistance of the capacitors in the bridge. The input impedance decreases as the bridge is unbalanced to a value dependent upon the degree of variation in the capacitance of the non-linear capacitors. It will be seen therefore that the highest average input impedance is obtained when the bridge is balanced in the absence of modulating voltage. It is preferred therefore to employ the modulator under conditions which give a balance in the absence of modulating voltage and hence to use a switched demodulator which may be as shown in Figure 8.

If a resistive unbalance is introduced into a modulator according to the present invention the output is in the form of a carrier in quadrature with the applied carrier whereby phase modulation can be achieved. A convenient method is to use a potentiometer as shown in Figure 5 and to offset the wiper from the position producing balance. Although this will not provide a true quadrature condition it will suffice for many purposes. In order to obtain true quadrature it is necessary to introduce a capacitive unbalance by adjustment of the capacitance of an appropriate one of the capacitors in the bridge or to introduce negative resistance in one arm and positive resistance in another.

It has been found that barium titanate and material sold by the United Insulator Company Ltd. under type No. H207 form suitable materials for the dielectrics of the non-linear capacitors. Since capacitance variation of a non-linear capacitor is dependent upon the voltage gradient across the dielectric the dielectric should be as thin as possible. It is preferred, therefore, to produce the capacitors by the deposition of a film of the dielectric on to a metal plate forming one of the plates of the capacitor. The other plate may then be formed on the film, for example, by vacuum deposition. Such an arrangement provides good heat dispersion from the dielectric which is of importance having regard to the fact that the permitivity varies with temperature.

Although the non-linear capacitors used throughout the embodiments hereinbefore described are polarised by means of a bias source, it will be appreciated that if the bias is omitted the modulator will function as a frequency doubler with respect to the modulating voltage.

It has been found that gains substantially in excess of unity over a bandwidth of 3 kc./s. can readily be obtained from amplifiers comprising modulators in accordance with the present invention.

We claim:

1. A modulator for modulating electric oscillations comprising a bridge in which at least one arm includes a non-linear capacitor, a source of carrier oscillations connected across one diagonal of the bridge, a source of modulating voltage connected to vary the capacitance of the non-linear capacitor in the bridge thereby generating across the other diagonal of the bridge oscillations having frequencies lying within a band of frequencies extending between and including the upper and lower sidebands of said carrier oscillations, and an inductive output circuit connected across the other diagonal of the bridge, the bridge being capacitive at the terminals of said other diagonal and providing with the inductive output circuit a circuit resonant at a frequency within said band, and a demodulator for demodulating the oscillations in said output circuit, said source of modulating voltage comprising a connection from the output of said demodulator for causing the circuit as a whole to function as an oscillator.

2. A modulator according to claim 1, wherein said demodulator comprises a further bridge of non-linear capacitors, the carrier is applied across one diagonal of the further bridge, the output of the modulator is applied to vary the capacitances of the non-linear capacitors and the output circuit of the modulator is connected across the other diagonal of the further bridge and is inductive and resonates with the capacitance of the further bridge or forms a low-pass filter therewith.

3. An oscillator comprising a modulator and a demodulator, said modulator comprising a bridge in which at least one arm includes a non-linear capacitor, inductive means coupling the input of said demodulator across one diagonal of said bridge, and means coupling the output of said demodulator across the other diagonal of said bridge, said bridge being capacitive at the terminals of said one diagonal and providing with said inductive means a resonant circuit.

4. An amplifier for electric oscillations comprising a modulator and a demodulator, each in the form of a bridge in which at least one arm includes a non-linear capacitor, a source of carrier oscillations coupled across one diagonal of each bridge, means for applying said electric oscillations to vary the capacitance of the non-linear capacitor in said modulator bridge, thereby generating across the other diagonal of said modulator bridge oscillations having frequencies lying within a band of frequencies extending between and including the upper and lower sidebands of said carrier oscillation, and inductive means coupling said other diagonal of said modulator bridge to vary the capacitance of the non-linear capacitor in said demodulator bridge, said modulator bridge being capacitive at the terminals of said other diagonal and providing with said inductive means a circuit resonant at a frequency within said band.

References Cited in the file of this patent

UNITED STATES PATENTS

| | | |
|---|---|---|
| 2,088,059 | Schulze-Herringen | July 27, 1937 |
| 2,191,315 | Guanella | Feb. 20, 1940 |
| 2,362,898 | Gilman | Nov. 14, 1944 |
| 2,462,093 | Grimes | Feb. 22, 1949 |
| 2,470,893 | Hepp | May 24, 1949 |
| 2,611,873 | Gager et al. | Sept. 23, 1952 |
| 2,616,989 | Hepp | Nov. 4, 1952 |